(12) United States Patent
Henderson

(10) Patent No.: US 12,526,891 B2
(45) Date of Patent: Jan. 13, 2026

(54) ZENER TRANSISTOR CONTROLLED LED ARRAY

(71) Applicant: Vode Lighting, LLC, Sonoma, CA (US)

(72) Inventor: Lee Henderson, Sonoma, CA (US)

(73) Assignee: Vode Lighting, LLC, Sonoma, CA (US)

( * ) Notice: Subject to any disclaimer, the term of this patent is extended or adjusted under 35 U.S.C. 154(b) by 151 days.

(21) Appl. No.: 18/206,054

(22) Filed: Jun. 5, 2023

(65) Prior Publication Data

US 2024/0407063 A1   Dec. 5, 2024

(51) Int. Cl.
*H05B 45/30*    (2020.01)
*H05B 45/395*   (2020.01)
*H05B 45/46*    (2020.01)
*H05B 45/48*    (2020.01)

(52) U.S. Cl.
CPC .......... *H05B 45/395* (2020.01); *H05B 45/46* (2020.01); *H05B 45/48* (2020.01)

(58) Field of Classification Search
CPC ...... H05B 45/10; H05B 45/30; H05B 45/395; H05B 45/46; H05B 45/48
See application file for complete search history.

(56) References Cited

U.S. PATENT DOCUMENTS

| 2010/0109557 A1* | 5/2010 | Bouchard | H05B 45/48 |
| | | | 315/312 |
| 2014/0062314 A1 | 3/2014 | Moskowitz | |
| 2021/0329759 A1* | 10/2021 | Liu | H05B 45/357 |

OTHER PUBLICATIONS

International Search Report and Written Opinion issued in International Application No. PCT/US2024/030770 on Sep. 27, 2024.

* cited by examiner

*Primary Examiner* — Jimmy T Vu
(74) *Attorney, Agent, or Firm* — ArentFox Schiff LLP; Joseph M. Maraia

(57) ABSTRACT

The present disclosure relates generally to an electronic control circuit and means to provide balanced power to a plurality of light emitting diodes (LEDs) connected in arrays for improved efficiency, luminosity and power management. The present disclosure further relates to the use of an improved multiple transistor-based electronic control circuit offering significant improvement in regulating voltage and current flow to a plurality of LEDs connected together in various combinations of serial blocks and parallel blocks. The present disclosure further relates to the use of a Zener diode that offers significant improvement in regulating the luminosity of a plurality of LEDs connected together in various combinations of serial blocks and parallel blocks, wherein the LED blocks contain an arrangement of an even number of LEDs, an odd number of LEDs, as well as even and odd numbers of blocks combined in serial and parallel arrangement, and combinations thereof.

9 Claims, 9 Drawing Sheets

RIGHT SIDE POWER ENTRY

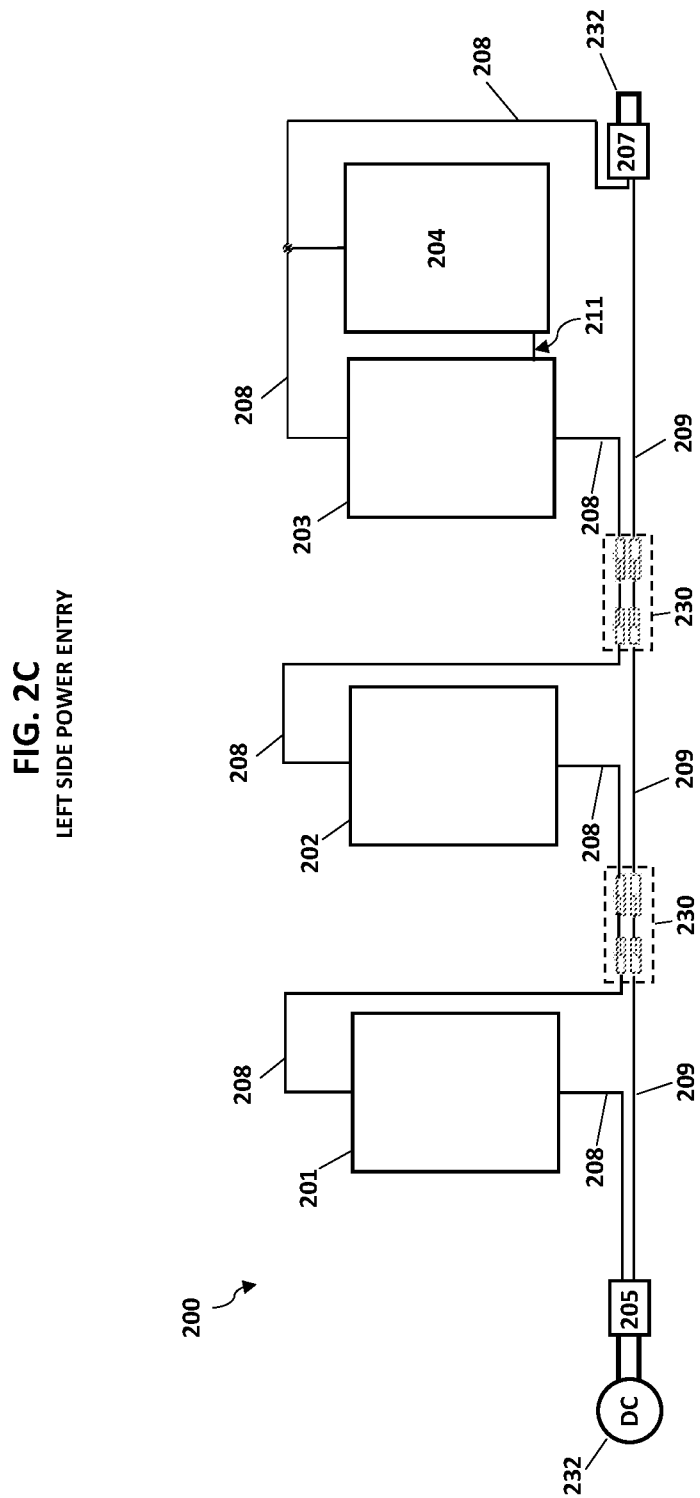

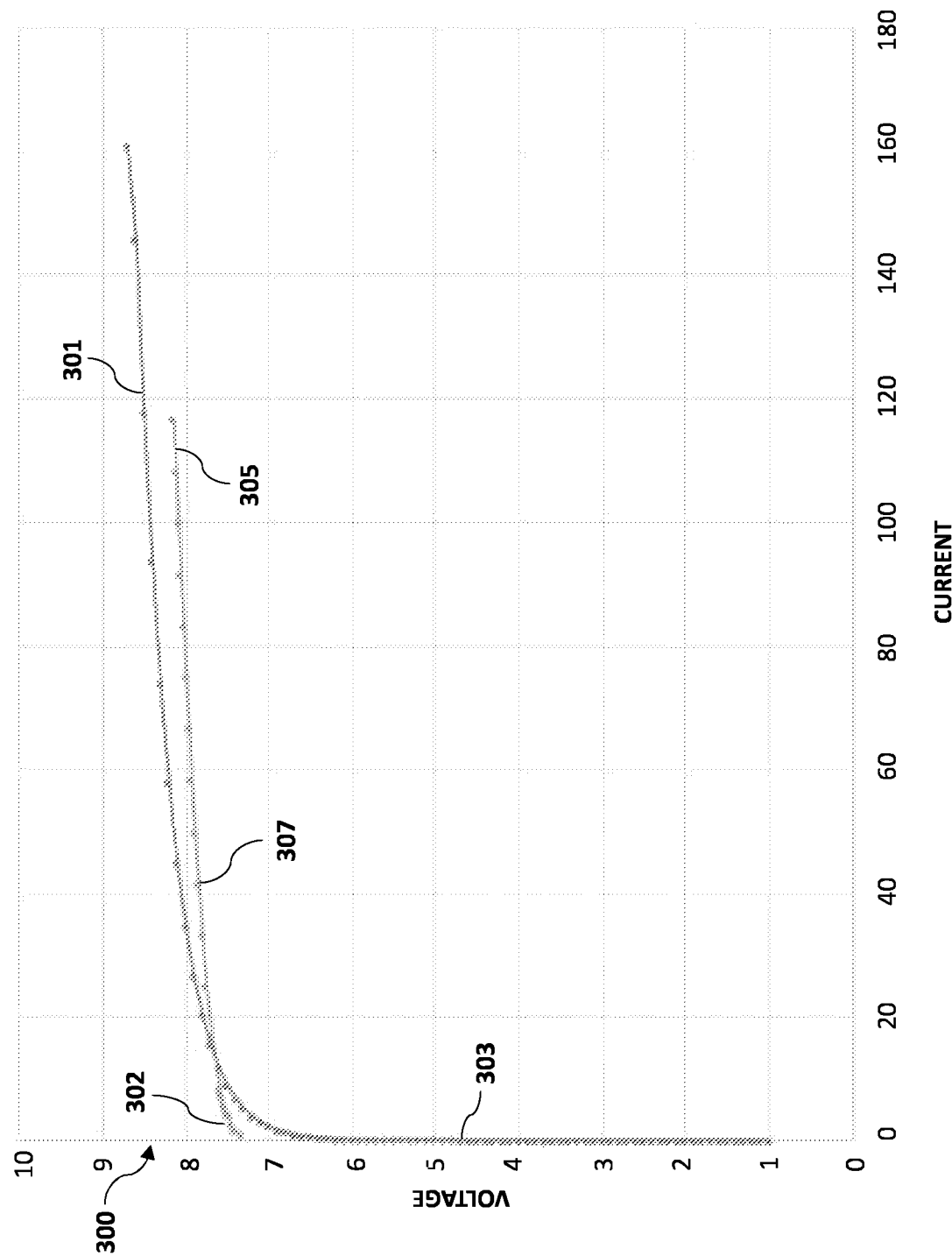

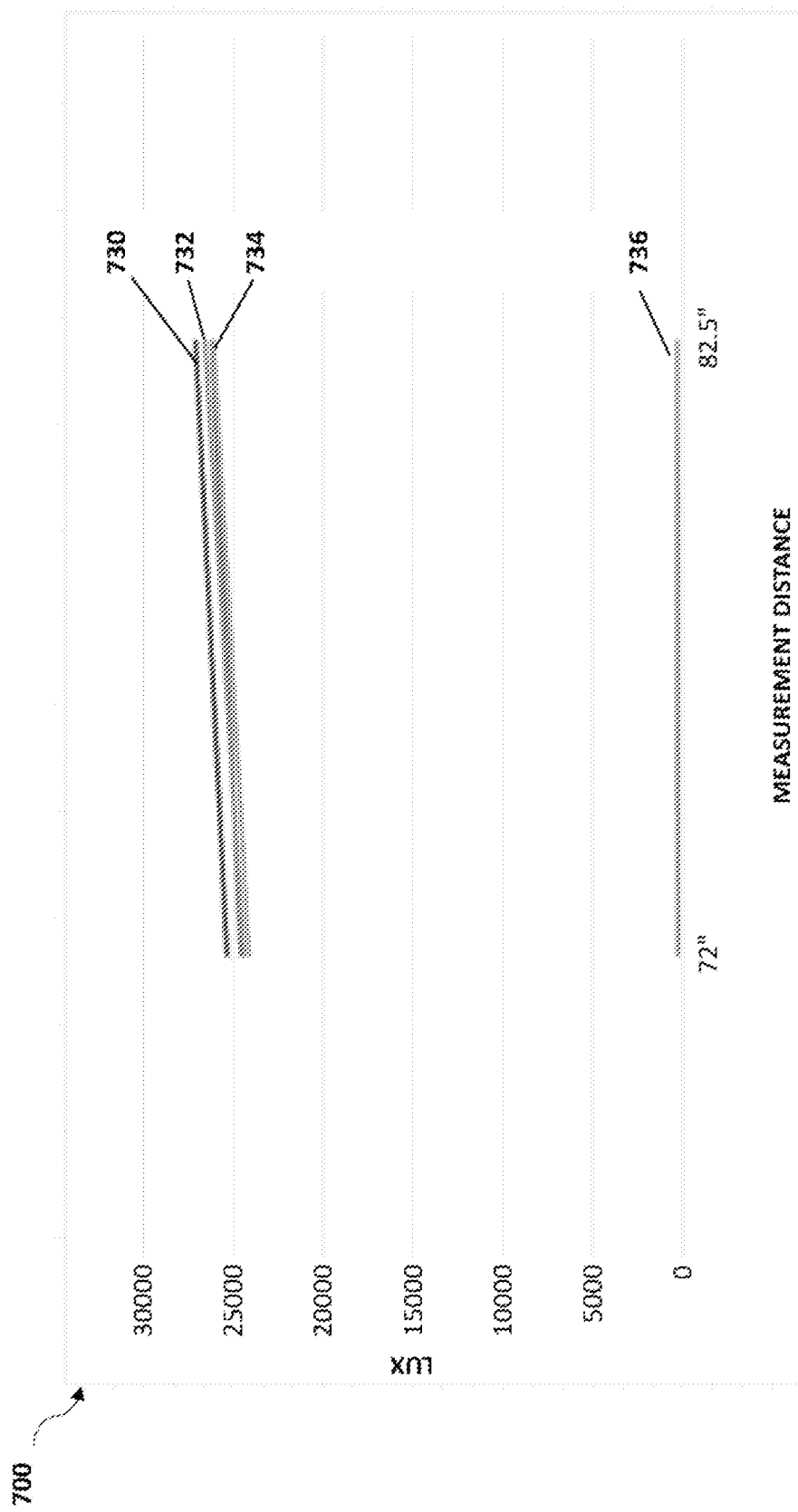

ZENER TRANSISTOR CONTROLLED LED ARRAY

BACKGROUND

Luminaires have traditionally been linear lighting elements employing a number of fixed length incandescent light tubes, thus limiting their length and versality in adapting to modern light standards of illumination. Replacement by LED (light emitting diode) tubes provided convenient upgrading to lower voltage and more reliable illumination, but the lengths mimicked and incorporated the restrictive lengths of their earlier progenies. More recently, LEDs have been employed in adaptive lighting fixtures and luminaires as well. However, adopted conventions, convenience and circuit limitations have limited their use in larger arrays to even number elements (i=2, 4, 6 . . . etc.) to control voltage (V), current draw (C) and optimize lighting or luminosity (L) when employing larger arrays of LEDs or LED blocks having larger numbers of individual LED elements. Odd numbers of LEDs, particularly when fixed on place or incorporated into a PCB (printed circuit board) tend to exhibit differences in voltage drop and current draw, resulting in differences in light intensity emitted between adjacent LED blocks and luminaires, as well as suboptimal luminosity overall.

SUMMARY

The present disclosure relates generally to an electronic control circuit and means to provide balanced power to a plurality of light emitting diodes (LEDs) connected in arrays and blocks for improved efficiency, luminosity, and power management. The present disclosure further relates to the use of an improved multiple transistor-based electronic control circuit offering significant improvement in regulating voltage and current flow to a plurality of LEDs connected together in various combinations of serial blocks and parallel blocks. The present disclosure further relates to the use of at least one Zener diode that offers significant improvement in regulating the luminosity of a plurality of LEDs connected together in various combinations of serial blocks and parallel blocks, wherein the LED blocks contain an arrangement of an even number of LEDs, an odd number of LEDs, as well as even and odd numbers of blocks combined in serial and parallel arrangement, and combinations thereof.

The current disclosure embodies multiple embodiments of a Zener diode based control circuit (also referred to herein as a "bleeder circuit") that serves to provide optimum current draw, maintain the voltage and according produce more optimized illumination delivered by an odd number of LEDs, and an odd number of LED PCBs (printed circuit board) that are combined, as well as optimizing the illumination of both even and odd numbers of LEDs and LED PCB with arrays of individual LED lighting elements.

Addition embodiments are disclosed herein, as shown in the accompanying figures and their description, which are presented as non-limiting examples of the present disclosure.

In general, the disclosure relates to the use of an LED circuit control unit, being an electronic circuit containing a collection of various electronic components, including connectors (wires, plugs, jumpers, conductive traces as per a configured or printed circuit board (PCB), and the like), electrical components, including but not limited to resistors, capacitors, transistors, diodes, and in particular Zener diodes, interconnected in various configurations to provide an electronically-based circuit control unit capable of monitoring, responding and outputting a desired set of electronic parameters to a single LED (light emitting diode) or collective of individual LEDs arranged together in some manner, to 100, wherein the LED circuit control unit accordingly controls the electronic and thus the illumination parameters of the LEDs to which it is in electronic communication when power is supplied to the connected units disclosed herein. The various embodiments presented herein relate to an LED circuit control unit which provides improved lighting characteristics to a luminaire system containing at least one LED lighting element.

The LED circuit control unit generally consists of an at least one LED element or an LED array block that is in electronic communication with control circuit block which is connected to one or more LEDS by means of at least one control circuit taps that connect a primary power connector and source of power to the control circuit, and a least one secondary power connector interconnected by either the first or a second control circuit tap to at least one primary power connector, and a common ground or secondary power connector to enable the flow of current through the LED circuit control unit and the plurality of LED elements.

BRIEF DESCRIPTION OF THE DRAWINGS

FIG. 2C shows a block diagram schematic of an LED control circuit according to the present disclosure showing blocks of LED arrays and a Zener diode based control circuit with a left side power entry and right side power tap.

FIG. 3 shows a voltage response curves of various embodiments of the disclosure.

FIG. 7 shows a luminosity plot of particular embodiments resulting from use of the disclosed control circuit.

DESCRIPTION

Generality of Invention

The following embodiments are non-limiting examples of the current disclosure illustrating the use of some specific LED components and circuitry components with certain performance characteristics and electronic properties to better illustrate the improved performance characteristics of the disclosed improved LED control circuit and supporting calculations.

In the various alternative embodiments disclosed herein, the LED control circuit can accommodate the use of any manufactures LEDs, requiring only a change to the degree of biasing in order to control any variation in the voltage drop, Vf, drop of any one specific LED or alternatively any block of LEDs, or multiple blocks of electronically coupled LED block. In these embodiments, the selection of the Zener diode is based upon the number of LED voltage drops on the printed circuit board (PCB). In one non-limiting example, wherein the PCB board is driving a multiple number of LED blocks, such as three LED blocks, a voltage of about 6.8V was selected. Alternatively, in the case of having only two LED block having two Vf drops on their LED board, a voltage of about 3.9V would be selected. The zener voltage may change depending on the Vf of the individual LEDs used on the board. The maximum amount of bleed current and the voltage vs. current slope is defined by the Beta of Q1 and Q3. The current can be lowered by increasing the resistance of R6 while maintaining the same slope required to adequately control the overall luminosity at different voltage drop values.

Figure 1:
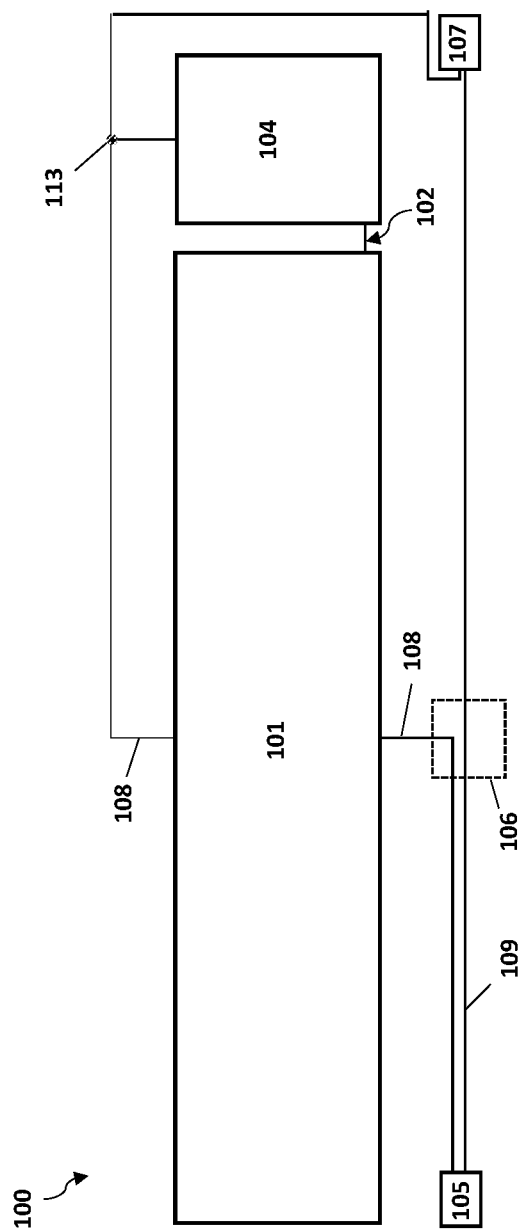
FIG. 1 shows a block diagram of an LED control circuit according to the present disclosure in association with a block of LED Light Emitting Diodes and a power tap.

FIG. 1 shows a block diagram of an LED control circuit according to the present disclosure in association with a block of LED Light Emitting Diodes and a power tap. FIG. 1 illustrates one exemplary embodiment of the overall configuration of a LED circuit control unit 100, that features a plurality of individual LED light emitting diodes within an LED array block 101. LED array block 101 is powered by a positive power tap 108, which connects electronically to the positive side of the control circuit block 104 by means of electrical junction 113. The control circuit block 104 receives power from a primary power connector 107, and modifies the voltage, amperage, or combination of the two circuit parameters to optimize the illumination output and other visual performance characteristics of the LED array block 101 emission properties. A control circuit tap 102 connects to the LED array block 101 as a common electronic connection between 101 and 104. Externally supplied direct voltage (DC) current is supplied using either or both a primary power connector 107 and a secondary power connector 105. In embodiments in which one of the LED array blocks 101 is located in a terminal position, or at the end of an array of interconnected LED array blocks 101 or at the end of an array of interconnected LED circuit control units 101, either one of the primary or secondary power connectors, 107 and 105, respectively, may remain in its normally open state (open electronically with no connection) or be closed by a tap to be a closed (electronically conductive) connection, depending on the overall desired configuration of the luminaire employing one or a plurality of the disclosed LED circuit control unit 101 as detailed herein.

In the embodiment shown in FIG. 1, the primary 107 and secondary 105 power connectors may individually or collectively (as power leads 108 and 109) provide direct current and voltage potential to both the LED array block 101 and the control circuit block by means of the positive power tap 108 and negative power tap 109. In operation, the control circuit block 104 features electronic components configured to provide optimized power output in terms of current, voltage and combinations thereof to the LED array blocks 101 to achieve the desired illumination properties desired of the LED circuit control unit 100 that is associated with a particular luminaire for the purpose of lighting an area or volume of space.

In one general embodiment relating to the disclosure shown in FIG. 1, the LED control circuit block 104 is powered by a constant current direct current (DC) voltage source using a primary power connector 107 which connects to 104 using a positive power tap 108 and a negative power tap 109, connected to the control circuit block 104 using a controlled circuit tap 102 to power the LED array block 101. A positive power tap 108 and a negative power tap 109 brings the LED array block 101 power from the primary power connector 107. Electrical junctions 113 are denoted by a black dot at the intersection of an electrical junction within the circuit as shown and described here in.

In an alternative embodiment, a set of two or more zero ohm jumpers (connectors) on the LED blocks according to FIG. 1 may be added to keep the LED board single sided or mounted to an heat sink substrate, such for example an aluminum substrate but including any acceptable mountable surface capable of heat transfer to maintain the mounted LED board at an optimum temperate, prevent overheating and prolong individual LED unit lifetimes an luminosity characteristics without change or decreased illumination intensity.

In an alternative embodiment, the current consumed by the bleeder circuit is dissipated in the resistors R4 and R11. In an alternative embodiment, R4 and R11 are selected from 0.5 to 1.5 watt resistors, or alternatively from 0.75 to 1.25, or yet alternatively from 0.9 to 1.125 watts.

In another alternative embodiment, R4 and R11 may have different resistive values and wattage values, or alternatively have different resistive values or alternatively have different wattage values, or have the same aforementioned resistive or same wattage values. In one non-limiting alternative embodiment, both R4 and R11 are 1 watt resistors and would therefore dissipate a maximum of 600 mW each.

In an alternative embodiment, this approach can be used as a technique to balance the load of any two boards with different numbers of LEDs in the parallel branches, by simply balances the load so that the luminosity or brightness of the two boards is the same within a reasonable tolerance. In an alternative embodiment, the tolerance is at least <10%, (<symbolically represents 'less than") or alternatively <7.5%, or alternatively, <5%, or yet alternatively <2.5%.

Figure 2A:
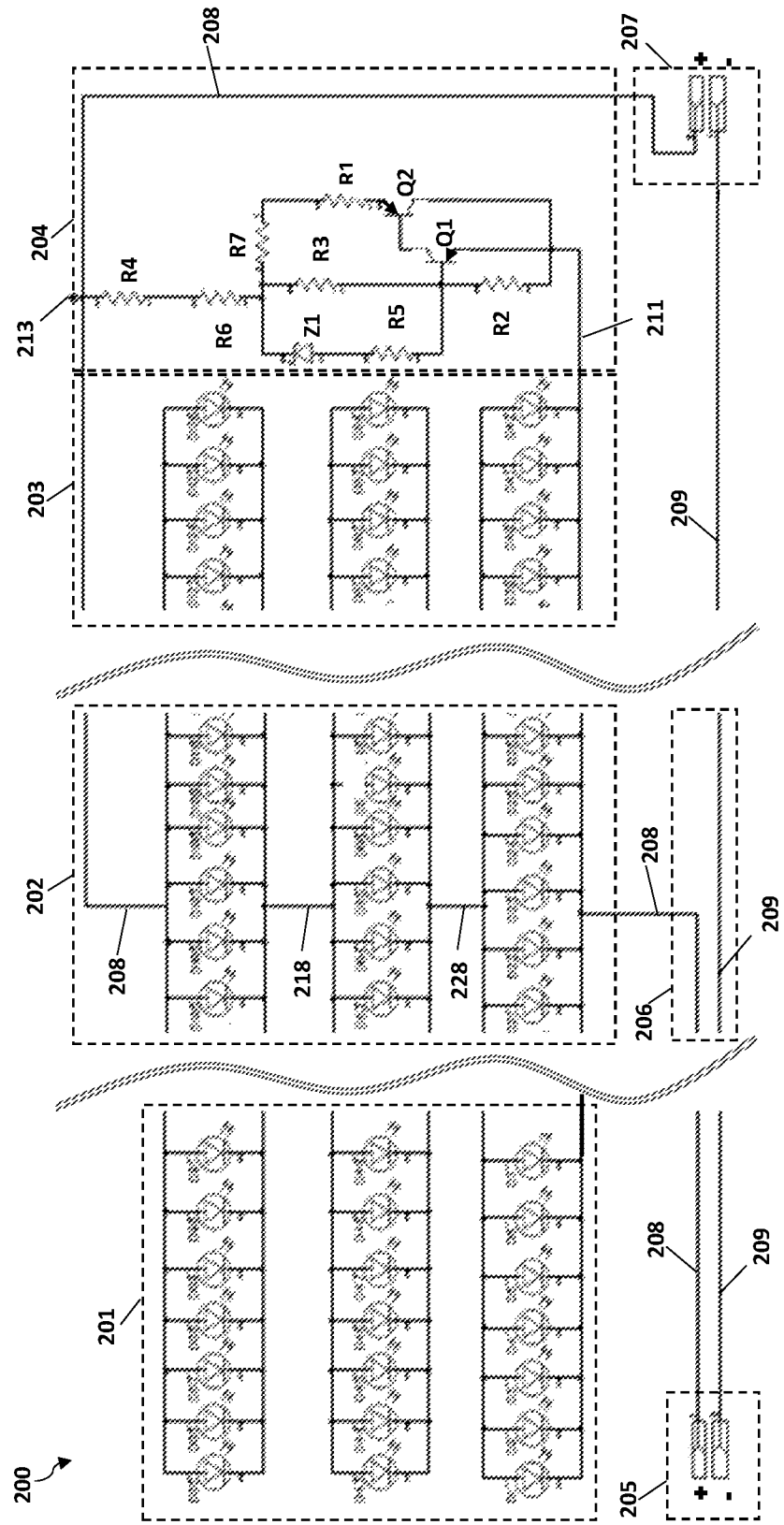
FIG. 2A shows a more detailed electronic schematic of an LED control circuit according to the present disclosure showing the configuration of individual LED elements and a Zener diode based control circuit and a power tap.

FIG. 2A shows a more detailed electronic schematic of an LED control circuit according to the present disclosure showing the configuration of individual LED elements and a Zener diode based control circuit and a power tap. In a second embodiment of the disclosure shown schematically in FIG. 2A, an LED circuit control unit is shown as LED circuit diagram 200, featuring three LED subarray blocks, a first 203, second 202 and third 201, respectively that are electronically contiguous with each other, but shown in a blowout perspective with the double wavy vertical lines being used to show their relative position with respect to one another, and indicated by dashed lines. Each of the LED subarray blocks features a collection of individual LEDs (arbitrarily labelled as DXX), shown in a linear series of LEDs in parallel configuration to each other, and in series configuration, electronically, to two additional LED subarray blocks within a particular first, second and third LED subarray blocks. All LED subarray blocks, 201, 202 and 203 feature a collection of individual LED electronic components, arranged in series, parallel, or combined electronic configurations, as desired, and are simultaneously powered by the positive power tap 208, which communicates to the power lead 206, connecting to either a primary 205 or secondary 207 power connector that provides current to the LED circuit control unit shown in FIG. 2. Power is supplied to the control circuit block 204, indicated by dashed lines, which receives power from the positive power tap 208 at the electrical junction 213 located at the high potential side of resistor R4 as shown, and via control circuit tap 211, which electronically couples the lower electric potential side of the three collective LED subarray blocks with 208 at the position of the power leads 206 which communicates electronically with at least one (as shown here) or both power connectors (not shown in this configuration).

In the various configurations employed, depending on whether the featured LED circuit control unit is located at either a right terminal end, a left terminal end or is positioned linearly in a continuous array of more than one collective LED subarray blocks, the various power leads 208, 209 may be reconfigured to provide the necessary voltage and current to the circuits, as will be shown in more detailed embodiments, herein below. Power supplied via the positive power tap 208 to the high potential side of the LED subarray block 202, is communicated to the other two LED arrays within block 202 by means of a first inter LED block power tap 218, and a second inter LED block power tap 228, and then ultimately power tap 208. As noted above, the three LED subarray blocks 201, 202 and 203 are electronically interconnected at the point of the thicker horizontal lines, in this representative configuration as shown.

In the embodiment shown in FIG. 2A, the control circuit block 204 employs a first Zener diode (1) Z1, two transistors, Q1 and Q2, and a configuration of resistive circuit components, resistors R3, R4, R6, R7, R8, R9, R10 and R11, each having a selected resistance value or range that enables the control circuit block 204 to detect, respond to and control the output power, voltage, current and combination of these electronic properties at the position of the electrical junction 213 and control circuit tap 211, which positions the control circuit block 204 in a parallel electronic configuration to one or a plurality of LED subarray blocks whose electrical properties are desired to be monitored and controlled by the disclosed control circuit blocks of the various embodiments detailed herein.

In the non-limiting example embodiment shown in FIG. 2A, the control circuit block 204 consists of (a) an electronic circuit wherein the electronic circuit is electrical coupled to at least one individual LED, an LED subarray, a block of individual LEDS and a block of LED subarrays, and combinations thereof, to enable the control circuit to turn on, turn off at least one LED and adjust the brightness of that at least one LED; wherein the high potential node (electronic junction) of the electronic circuit or control circuit block 202 is electrically coupled to the positive side of a direct voltage (DC) power supply source via positive power tap 208; wherein the low potential node of the electronic circuit is electrically coupled to a negative side of a direct current (DC) power supply source that is in electrical communication with that DC power supply source via control circuit tap 211; wherein the first emitter of a first transistor (Q1) is electronically coupled to the low potential node of the control circuit and coupled to the second collector of a second transistor (Q2); wherein the first collector of said Q1 is electronically coupled to the second base of transistor Q2; wherein the second emitter of Q2 is electronically coupled to the low potential node of a first resistor (R1); wherein the first base of said Q1 is electronically coupled to the high potential node of a second resistor (R2), the low potential node of a third resistor (R3) and the low potential node of a fifth resistor (R5); wherein a low potential node of said second resistor (R2) is coupled to the low potential node of said control circuit; wherein the high potential node of resistor R5 is electronically coupled to the low potential node of a first Zener diode (Z1); wherein the high potential node of Zener diode Z1 is electronically coupled to the high potential node of resistor R3, the low potential node of a sixth resistor (R6) and the high potential node of a seventh resistor (R7); wherein the high potential node of said R1 is electronically coupled to the low potential node of said R7; wherein the high potential node of both resistors R3 and said R7 are electronically coupled to the low potential node of resistor R6; wherein the high potential node of said R6 is electronically coupled to the low potential node of resistor R4; and wherein the high potential node of resistor R4 is electronically coupled to the positive side of a direct current (DC) power supply source, which supplies power to the LED control circuit as shown in LED circuit diagram 200 and to the plurality of individual LEDs contained within one or more LED arrays, as modified by means of the electronic monitoring, control and output of the integrated control circuit block 204.

In general, the value of the various resistors (Rxx) employed in the disclosed embodiments herein may be independently selected or may be selected in relation to the value of another resistor in order to achieve the desired electronic properties of the control circuit. When a value of a first resistor, for example R1, is selected, this selection informs what value a second, third, fourth, etc. resistor must be, within some reasonable tolerance value, should be to achieve the desired electronic properties of the control circuit. Further, the values of the various resistors are selected with respect to the electronic properties of the transistors (Q1, Q2, Q3, etc.) used in the control circuit as well as those of the at least on Zener diode transistor employed. Table 1 hereinbelow shows the nominal values of a several non-limiting embodiments of the present disclosure of the resistors used, as well as an acceptable range of values for each. The values of resistance for the various resistive elements are for the particular embodiments disclosed, and are non-limiting, being selected on the basis of the particular characteristics of the combined control circuitry and LED block power demand and luminosity optimization that is to be achieved by the luminaire employing the control circuitry in conjunction with one or more LED elements, one or more LED blocks, one or more LED arrays, and combinations thereof.

The nominal values and range depend on the circuit layout and attachments, as well as being dependent on selecting their resistive values based on the electronic characteristics of the transistor and diode circuit components, as well as the properties of the control circuit and the control circuit in combination with the LEDs and associated individual light emitting elements composing a luminaire according to the disclosed embodiments. Some resistive elements are optional, and their selection as whether included is designated in Table 1 as "0" (absent, no resistance) under these circumstances, otherwise being present as disclosed in one or more of the example but-non limiting circuit examples, and having a value within the presented range, or a particular non-limiting value in one or more of the illustrative examples presented.

TABLE 1

| Resistor | Nominal Resistance (ohms) (K = kilo) | Acceptable Range Resistance | Example A | Example B | Example C (Embodiment shown in FIG. 1) | Example D (Embodiment shown in FIG. 1) | Example E (Embodiment shown in FIG. 1) |
|---|---|---|---|---|---|---|---|
| R1 | 0.5-100 k | 0.5-100 k | 0.5-100 k | 0.5-100 k | 465 k | 0 | 50 k |
| R2 | 0.50-100 k | 0.50-100 k | 0.50-100 k | 0.50-100 k | 40 | 0 | 40 |
| R3 | 39 k | 5-100 k | 39.2 k | 97.6 k | 10 k | 4.87 k | 50 k |
| R4 | 22 | 10-50 | 22 | 22 | 25 | 0 | 25 |
| R5 | 0.50-100 k | 0.50-100 k | 0.50-100 k | 0.50-100 k | 1 k | 97.6 k | 2 k k |
| R6 | 0.50-100 k | 0.50-100 k | 0.50-100 k | 0.50-100 k | 0.50-100 k | 0 | 0.50-100 k |
| R7 | 4.2 k | 3.3 k-10 k | 3.16 k | 4.87 k | 3.6 k | 8.25 k | 3.6 k |
| R8 | 0.50-100 k | 0.50-100 k | 0.50-100 k | 0.50-100 k | | 0 | |
| R9 | 0.10-100 k | 0.10-100 k | 0.10-100 k | 0.10-100 k | 0.10-100 k | 0 | 0.10-100 k |
| R10 | 10 k | 4.7 k-15 k | 7.5 k | 8.25 k | 8.0 k | 0 | 8.5 k |
| R11 | 22 | 10-50 | 22 | 22 | 22 | 4.7 k | 22 |

In related embodiments, a Negative Temperature Coefficient (NTC) thermistors may be placed in parallel with a biasing resistor in order to manage thermal changes and heat generated by an adjacent resistive element, transistor, and combinations thereof as a non-limiting example, an NTC thermistor can be included in the circuit represented by Example A, in parallel circuit configuration to Resistor 4. The addition of NTC thermistors aids in these embodiments by improving the illumination characteristics of the luminaire controlled by the disclosed control circuits, particularly when changing the dimming level to minimum after the fixture have developed to full brightness for a couple of minutes and have achieved high current loads and component elements have thus achieved a nominal operating temperature and heat dissipation and removal are in progress to an equilibrium state. It is also human habit to 'fiddle with the controls' during the first operation of a luminaire to turn on and adjust illumination characteristics during which time the electronic components are activated and attempting to reach a steady state output, particularly if on a dimming circuit, including an externally controlled dimmer circuit as well as an internal intensity control.

SPECIFIC EMBODIMENTS

The following embodiments are presented as non-limiting examples of the disclosed electronic control circuits discussed herein below in further alternative embodiments and examples.

In one embodiment, an electronically configured control circuit controls the dimming and lighting of an associated light emitting diode in a luminaire, having an electronic control circuit; a direct current (DC) power source providing a high potential positive voltage pole (V+) and a low potential negative ground voltage pole (V−); wherein at least one high potential node of the control circuit is electrically coupled to the positive voltage pole (V+) of said DC power source; wherein at least one low potential node of said control circuit is electrically coupled to the negative voltage pole (ground) of said DC power source; wherein the high potential node of said control circuit is electrically coupled to V+ and at least one high potential node of at least one LED; wherein the first emitter of a first transistor (Q1) is electronically coupled to said low potential node of said control circuit and coupled to the second collector of a second transistor (Q2); wherein the first collector of said Q1 is electronically coupled to the second base of said Q2; wherein the second emitter of said Q2 is electronically coupled to the low potential node of a first resistor (R1); wherein the first base of said Q1 is electronically coupled to the high potential node of said R2, the high potential node of a second resistor (R2), the low potential node of a third resistor (R3) and the low potential node of a fifth resistor (R5); wherein the high potential node of said R5 is electronically coupled to the low potential node of a Zener diode (Z1); wherein the high potential node of said Z1 is electronically coupled to the high potential node of said R3, the low potential node of a sixth resistor (R6) and the high potential node of a seventh resistor (R7); wherein the high potential node of said R1 is electronically coupled to the low potential node of said R7; wherein the high potential node of both said R3 and said R7 are electronically coupled to the low potential node of said R6; wherein the high potential node of said R6 is electronically coupled to the low potential node of said R4; wherein the high potential node of said R4 is electronically coupled to said positive side of a direct current (DC) power source; and wherein a low potential node of said second resistor R2 is coupled to said low potential node of said control circuit.

In a further embodiment, the electronically configured control circuit is connected to and controls a plurality of light emitting diodes (LED).

In a further embodiment, the control circuit includes a second Zener diode is present in the control circuit and electronically coupled to a first Zener diode; wherein at least one low potential node, one high potential node, and combinations thereof of a first and second Zener diodes are electronically coupled.

In yet another embodiment, the second Zener diode is electrically connected in series, in parallel, stacked with all common nodes electronically coupled, and combinations thereof; wherein at least one of the nodes of the second Zener diode is electronically coupled to at least one node of the first Zener diode.

In another embodiment, the electronic control circuit may contain one or more additional resistive elements electronically coupled to any one or more of a first, second, third, fourth, fifth, sixth and seventh resistor in an electrically serial, parallel, or mixed serial and parallel configuration, and combinations thereof.

An alternative embodiment includes an electronically configured control circuit for controlling the dimming and lighting of an associated light emitting diode in a luminaire; including (a) a control circuit; (b) a direct current (DC) power source providing a high potential positive voltage pole (V+) and a low potential negative ground voltage pole (V−); (c) a plurality of light emitting diodes (LED); wherein at least one high potential node of said control circuit is electrically coupled to the positive voltage pole (V+) of said DC power source; wherein at least one low potential node of said control circuit is electrically coupled to the negative voltage pole (ground) of said DC power source; wherein the high potential node of said control circuit is electrically coupled to V+ and at least one high potential node of at least one LED; wherein a first transistor (Q1) has a first collector that is electronically coupled to a second base of a second transistor (Q2); wherein the first emitter of Q1 is electronically coupled to ground; wherein the first base of Q1 is electronically coupled to the high potential node of a first resistor (R1); wherein the low potential node of R1 is electronically coupled to ground; wherein the first base of Q1 is electronically coupled to the high potential nodes of a second transistor (R2); wherein the second collector of Q2 is electronically coupled to ground; wherein the second emitter of Q2 is electronically coupled to the low potential node of a third resistor (R3); wherein the high potential node of R3 is connected to the low potential node of a fourth transistor R4; wherein the low potential node of R4 is electronically coupled to ground; wherein the high potential node of R4 is connected to V+; wherein the high potential node of a fifth resistor (R5) is connected to V+; wherein the low potential node of R5 is connected to the high potential note of R1; wherein the low potential node of a sixth resistor (R6) is electronically coupled to the high potential node of R2; wherein said high potential node of R6 is electronically coupled to the first anode of a first Zener diode Z1; and wherein the first cathode of Z1 is connected to V+.

In an alternative embodiment, the control circuit has a second Zener diode present in the control circuit and electronically coupled to said first Zener diode; wherein at least one low potential node, one high potential node, and combinations thereof of said first and said second Zener diodes are electronically coupled; and optionally the control circuit has a second Zener diode that is electrically connected in series, in parallel, stacked with all common nodes electronically coupled, and combinations thereof; wherein at least one of the nodes of said second Zener diode is electronically coupled to at least one node of said first Zener diode.

In further embodiments the electronic control circuit may contain one or more additional resistive elements electronically coupled to any one or more of said first, second, third, fourth, fifth, sixth and seventh resistor in an electrically serial, parallel, or mixed serial and parallel configuration, and combinations thereof.

In another embodiment, an electronically configured control circuit is used for controlling the dimming and lighting of an associated light emitting diode in a luminaire; and the electronically configured control circuit features (a) an electronic control circuit; (b) a high potential positive voltage pole (V+) and a low potential negative voltage pole (V−); wherein at least one high potential node of said electronic control circuit is electrically coupled to the positive voltage pole (V+); wherein at least one low potential node of said electronic control circuit is electrically coupled to the negative voltage pole (ground); wherein the highest potential node of said electronic control circuit is electrically coupled to V+; wherein a first transistor (Q1) has a first collector that is electronically coupled to a second base of a second transistor (Q2); wherein the first emitter of Q1 is electronically coupled to ground; wherein the first base of Q1 is electronically coupled to the high potential node of a first resistor (R1); wherein the low potential node of R1 is electronically coupled to ground; wherein the first base of Q1 is electronically coupled to the high potential nodes of a second transistor (R2); wherein the second collector of Q2 is electronically coupled to ground; wherein the second emitter of Q2 is electronically coupled to the low potential node of a third resistor (R3); wherein the high potential node of R3 is connected to the low potential node of a fourth resistor R4; wherein the low potential node of R4 is electronically coupled to ground; wherein the high potential node of R4 is connected to V+; wherein the high potential node of a fifth resistor (R5) is connected to V+; wherein the low potential node of R5 is connected to the high potential note of R1; wherein the low potential node of a sixth resistor (R6) is electronically coupled to the high potential node of R2; wherein said high potential node of R6 is electronically coupled to the first collector (by anode of a first Zener diode Z1; and wherein the cathode of Z1 is connected to V+. In an alternative embodiment, referring to FIG. 2A, the collector or anode of Z1 is connected to R6 which is V+; and the anode is connected to R5 which puts Z1 and R5 in parallel with R3.

In further embodiments, the selection of the transistors is based on the desired current gain, with some embodiments employing transistors with an Hfe (beta vale of a resistive transistor) of between 60 and 400, which provides optimized performance in these embodiments. In addition or as an alternative selection process, the disclosed transistors are also selected so that their performance characteristics are a good functional match particularly as to electronic response in the linear part of the LED's voltage vs current region, with current draw and voltage response as shown herein in one of the luminosity and voltage plots disclosed.

Figure 2B:
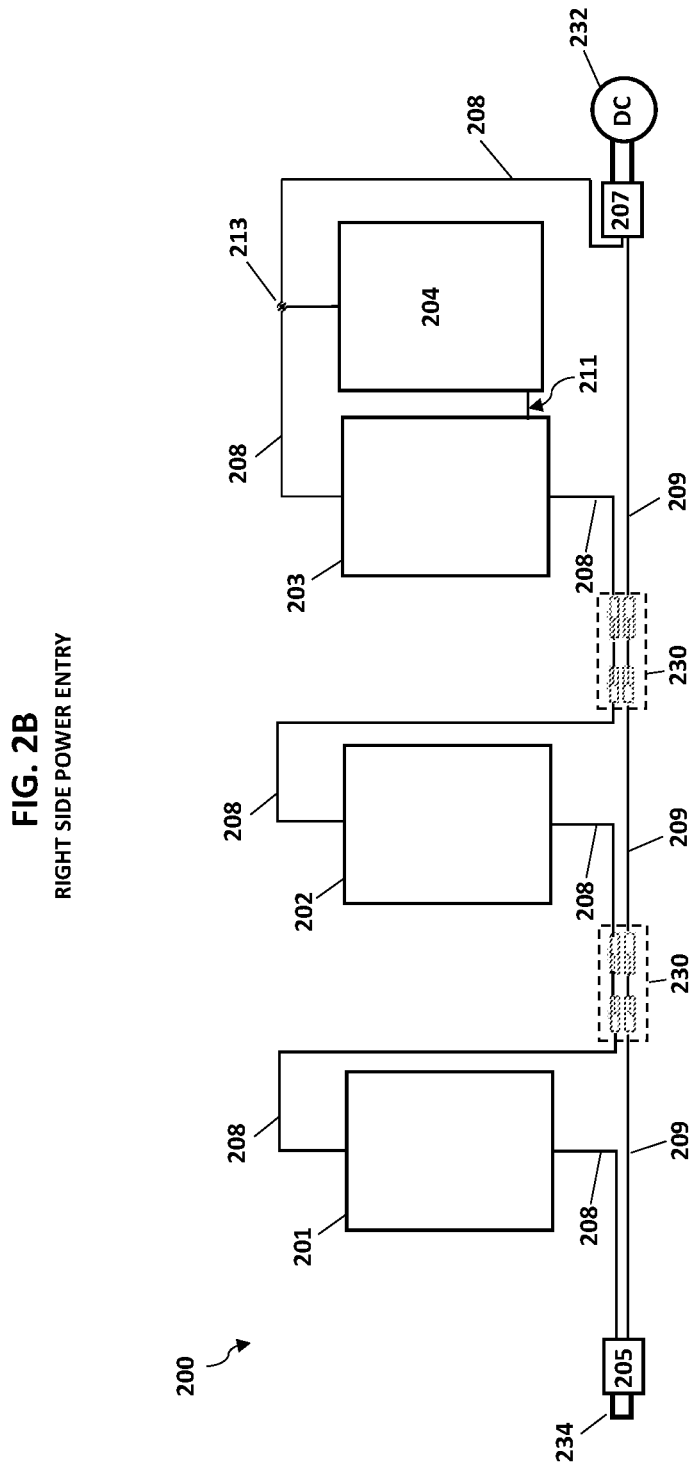
FIG. 2B shows a block diagram schematic of an LED control circuit according to the present disclosure showing blocks of LED arrays and a Zener diode based control circuit with a right side power entry and left side power tap.

FIG. 2B shows a block diagram schematic of an LED control circuit according to the present disclosure showing blocks of LED arrays and a Zener diode based control circuit with a right side power entry and left side power tap, in addition to power intercoupling connectors to provide power to adjoining LED blocks.

In the related alternative embodiment shown in FIG. 2B, the first, second and third subarray blocks may be individual units of LEDs configured similarly as shown in FIG. 2A, but not integrated on a common circuit board or contiguous with one another. In this alternative embodiment, a control circuit block 204 is shown featuring a power lead 208 providing it power which also provides power to one of the LED blocks 203. The control circuit block 204 also has a control circuit tap 211 that provides a modified power signal to the LED block 203 for purposes of controlling the power supplied to that LED block 203, while the non-modified LED blocks 202 and 201 receive power through the common electrical junction 213.

FIG. 2C shows a block diagram schematic of an LED control circuit according to the present disclosure showing blocks of LED arrays and a Zener diode based control circuit with a left side power entry and right side power tap, in addition to power intercoupling connectors to provide power to adjoining LED blocks.

In one embodiment, this approach is employed to balance the collective LED brightness for "odd" length boards, in contrast to conventional approaches that attempt this by adding a "dummy" LED to the board that is added and optically blocked (hidden or covered) so that its deficit emission is hidden, which results in decreased lighting and waste of an LED or resistive element.

To complete the circuit a shunt (wire) at reference 207 is connected at the point of the last PCB in the circuit. Whereas shown in FIG. 2A, in the configuration where the last PCB in a stack of other LED boards, power is applied at the secondary power connector 205. In an alternative embodiment wherein the power is applied on the left side of the circuit shown in FIGS. 2A-C, that polarity may be reversed. The positive voltage is then accordingly applied to the negative side of the secondary power connector 205 and the negative voltage lead is applied to the positive side instead, resulting in the shunt being positioned at the end of the circuit between the negative and positive power coupling, which changes then the positive side of the anodes of the top LED string while the negative terminal gets applied to the cathode side of the interconnected LED array, as shown in FIG. 2B.

If the power entry is on the right side (as shown in one embodiment in FIG. 2C) instead, supplying voltage to the primary power connector 207, then polarity is not reversed. In this embodiment, the shunt is applied across the positive and negative terminals of the secondary power connector 205 and the LED board with the bleeder circuit is the first PCB in a series of LED PCBs.

This topology allows the PCB with the bleeder circuit to be placed at any location along the fixture length, for example even being located electronically and physically in the middle of the LED array or LED block. As a result, the positive and negative sides of each LED board are isolated from the other LED PCBs, enabling the unique bleeder circuit to only need to supply power across a single LED board, allowing the extra bleed current to be consumed only by that particular LED board, while the other PCBs (ones without the bleeder circuit) are not affected by the bleeder circuit, creating greater illumination control for the entire LED array, as well as benefits in higher efficiency and control, as well as practical considerations including cost of redundancy, size and configuration of the components on the LED board.

FIG. 3 shows a voltage response plot 300 illustrating a desired target response curve 301 voltage (Y-Axis) with respect to the current (X-Axis). The response curves exhibit a transition between an initial linear response region indicated by a sharp (high slope) increase seen in an onset voltage rise 303, that transitions to a second linear response region with a lower slope with respect to current, indicated by the target response curve 301 and the simulated current curve 305. The sharp transition region, or knee inflection point, is a first response desired to be controlled by means of the control circuit embodiment as disclosed herein, with the purpose of changing the behavior or electronic response of the combined system (LED array and control circuit) to more closely model the target response curve 301 in the vicinity of the knee inflection point 302 in order to achieve balanced luminosity, as well as to increase the overall luminosity of the combined system to maximize the light emission of the luminaire employing one or more of the disclosed embodiments. As seen in FIG. 3, the target response curve 301 delivers a higher effective voltage potential versus applied current in comparison to the simulated current curve 305, which however does not respond well at current levels near the knee inflection point 302. In contrast, the target response curve achieved by means of the control circuit embodiments as disclosed herein, result in a smoother transition between the two aforementioned linear response regions as seen by a much smoother transition at the knee inflection point 302 as the onset voltage 303 rises rapidly upon circuit activation.

Figure 4:
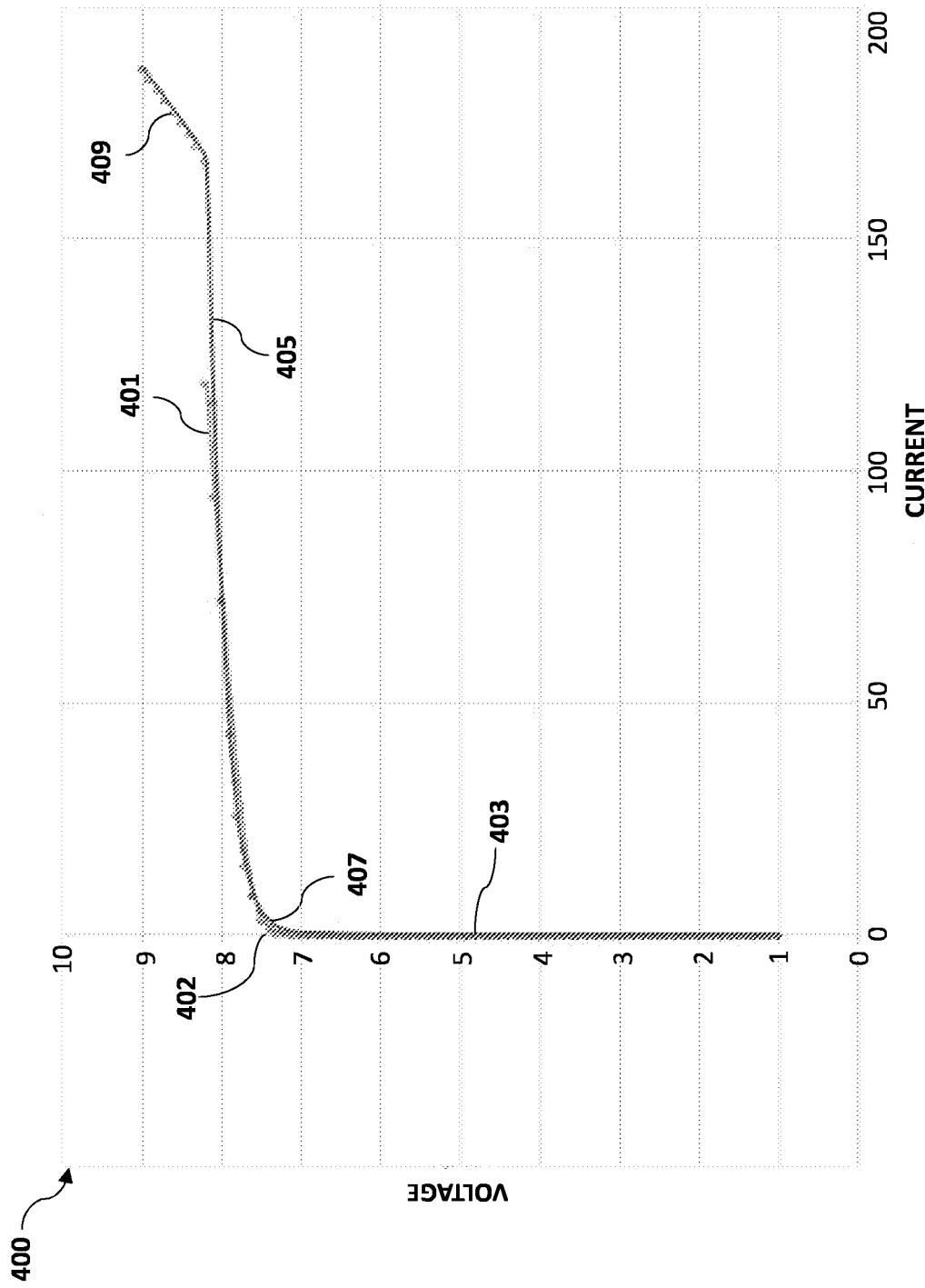
FIG. 4 shows voltage response curves of various embodiments of the disclosure.

FIG. 4 shows a voltage response plot 400 illustrating a desired target response curve 401 voltage (Y-Axis) with respect to the current (X-Axis). The response curves exhibit a transition between an initial linear response region indicated by a sharp (high slope) increase seen in an onset voltage rise 403, that transitions to a second linear response region with a lower slope with respect to current, indicated by the target response curve 401 and the simulated current curve 405. The sharp transition region, or knee inflection point, is a first response desired to be controlled by means of the control circuit embodiment as disclosed herein, with the purpose of changing the behavior or electronic response of the combined system (LED array and control circuit) to more closely model the target response curve 401 in the vicinity of the knee inflection point 402 in order to achieve balanced luminosity, as well as to increase the overall luminosity of the combined system to maximize the light emission of the luminaire employing one or more of the disclosed embodiments. As seen in FIG. 4, the target response curve 401 delivers a higher effective voltage potential versus applied current in comparison to the simulated current curve 405, which however does not respond well at current levels near the knee inflection point 402. In contrast, the target response curve achieved by means of the control circuit embodiments as disclosed herein, result in a smoother transition between the two aforementioned linear response regions as seen by a much smoother transition at the knee inflection point 402 as the onset voltage 403 rises rapidly upon circuit activation.

FIG. 4 also shows an overdrive inflection point 409 where the voltage rapidly rises with applied current and is an undesirable voltage response.

Figure 5:
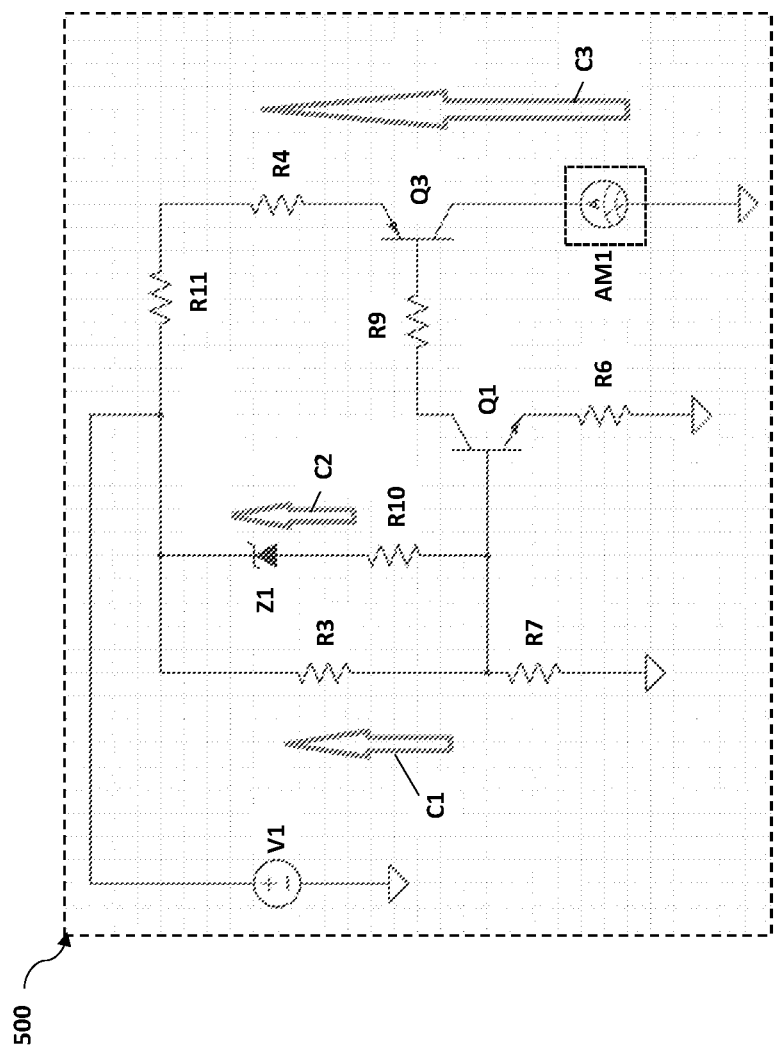
FIG. 5 shows an alternative embodiment of a Zener based control circuit featuring additional resistive trimmer elements for modifying and controlling the power supplied to a LED element or LED block.

FIG. 5 shows an alternative embodiment of a Zener based control circuit featuring additional resistive trimmer elements for modifying and controlling the power supplied to a LED element or LED block. FIG. 5 also is illustrated with a set of directional arrows that show the direction of current flow within the circuit. It should be noted that the values of the resistive elements (Rx . . . Ri) apply to the particular embodiment disclosed, and that these values may differ, and may differ when another resistor is selected for the control circuit having a different resistive value (typically expressed in units of "ohm" or a metric equivalent, for example, kilo-ohm being 1,000 ohms). When the Zener diodes and transistors are selected, the values of the various resistive elements may be modified slightly to accommodate the particular performance characteristics of those components, in order for the control circuit to perform as described herein and control the current flow to one or more LED elements for the purpose of controlling the light intensity or luminosity of a group of two or more LED elements or LED blocks.

A transistor is basically a current amplifier, wherein the current gain is denoted as the beta (B) of that transistor. Any current flowing from the base of the transistor is amplified by an amount equal to the product of the beta value of the transistor. In the exemplative embodiments disclosed herein, two transistors, Q1 and Q2 are present, so the total current (denoted as Ic) flowing in through the collector to the emitter of Q2 is the product (* denotes "times" or the multiplicative operation) of the beta of both transistors' times the current flowing from the base (denoted as Ib) as given by the following equation:

$$Ic = Ib * \beta(Q1) * \beta(Q2) \qquad \text{Eq. 1}$$

In this particular non-limiting embodiment, the transistors are selected so that their electronic response with respect to their output characteristics matches the slope of the linear region of a 24" series board with a plurality of individual LEDs present, the slope being about 8.33 mA/100 mV. (m=milli).

In this and related embodiments, the positive (high potential) and negative (low potential) sides of the bleeder circuit are as shown in FIG. 2. The reference marked 204 being the positive side and the reference marked 211 being the negative side. Consistent with the embodiments of the disclosure, any extra current is drawn away from the LEDs on the board by the bleeder circuit that would normally be consumed by the number of parallel LEDs missing from the board as compared to standard length LED boards. This allows each LED on a complete luminaire of illumination fixture to have the same amount of current flowing through it and thus ensure that the resulting emitted brightness of each LED is equal.

FIG. 5 shows an alternative embodiment of a Zener based control circuit featuring additional resistive trimmer elements for modifying and controlling the power supplied to a LED element or LED block by means of controlling the flow of current, which is measurable by the temporary placement of an ammeter in series with a common circuit ground tap in common with the low potential (negative side of a supplied power source. The current (amperage) flowing through each segment is illustrated by arrows labelled C1 (current flow 1), C2 (current flow 2) and C3 (current flow 3), respectively, and the direction of the arrow indicating the direction of actual electronic current therein.

In addition, the control circuit 500 also shows resistors R3, R4, R6, R7, R10, R11 and R11 that provide resistive elements in the circuit in combination with two transistors Q1 and Q2, whose characteristics are controlled by these elements in conjunction with a Zener control diode Z1. This example embodiment also shows where a temporarily introduced ammeter, AM1, is used to measure the actual current flow through that particular leg of the control circuit as shown.

The first stage of this current amplifier consists of transistor Q1, the biasing resistors R3 and R7 along with the zener diode Z1 and resistor R10. This stage is biased near the cutoff point on the transistor load line. This biasing is selected so the transistor begins to turn on near the same knee (transition or inflection point) voltage of about 7.4V. Most of the current gain happens in the second stage that consists of transistor Q3 along with the power dissipation resistors R4 and R11. To calculate the base voltage, the following relationship is applied, wherein, at a potential of 7.4V, the base voltage (Vb) is calculated as:

$$Vb = (1k/(13.7k + 1k)) * 7.4 \text{ V} = 0.503 \text{ V} \qquad \text{Eq. 2}$$

In this particular example embodiment, the addition of the Zener diode and resistor R10, act to bring this voltage up a bit to 0.527V. This biasing, along with the Zener diode bias, sharpens the knee of the entire circuit such that it exhibits a very small non-linear response to the power output curve to simulate the sharp knee of the LEDs themselves. Transistor Q3 is then selected based upon the current gain needed to match the desired target current consumption of the collective set of LED elements.

Comparison data obtained from testing two different boards bearing a different number of individual LED elements was compared to show the target voltage versus the current curve for the bleeder circuit along with data from an actual prototype. The actual measured current is very close to that of the theoretical or target response desired, which maintains the overall luminaire brightness delta between a 24 inch board and a 21 inch board (bearing fewer total LEDs) with the bleeder circuit, to less than a 10% difference. While this 10% variation is the upper limit of acceptability based upon observational evaluation, alternate embodiments of the bleeder circuit may be tuned by selection of the various resistor values, bias values, and voltage characteristics of the control transistors, Qn (n=1, 2. 3 . . . ) to achieve variations of less than 7.5%, or alternatively variations of less than 5.0%, or yet alternatively variations of less than 2.5% in terms of total luminaire light output intensity.

Generally, illumination differences below 10% cannot be easily detected by the human eye. This "rule of thumb" has been used for a number of years, but the current disclosure presents embodiments that can achieve this effect consistently, even with the combination of different numbers of LEDs and whether they are in serial or parallel configurations, and act to improve illumination consistency even when extremely different lengths of LED board, and hence the number of total LEDs varies significantly, and also when odd and even numbered LED array blocks are combined and controlled by the Zener control circuit. Data presented graphically herein and data obtained from measuring the brightness output of 10 actual functional luminaires including a 21 inch LED board loaded onto a 93 inch rail support which is a popular configuration wherein the 21 inch board is combined with three 24 inch boards on the rail support.

In this non-limiting example embodiment, one first determines and selects an approximate Zener diode voltage selection. Selection is based on the number of LED forward voltage drops necessitated by the total number of LED elements or LED blocks. As shown, a total of three LED voltage drops are needed. Transistors produced by Nachia specifies that the voltage drop for each diode is approximately about 2.8-2.9V, as exhibited by use in the 21 inch LED board with the bleeder circuit integrated. In operation, the Zener control circuit is then tasked with bleeding off the amount of extra current from the LEDs missing from the 21 inch board as compared to the 24 inch board which would otherwise consumer greater current resulting in greater than desired illumination and current draw compared to the smaller LED board.

Consistent with basic transistor theory, the voltage at the base of Q1 shown is generally below is 0.6V when the transistor is active or in an "ON" state. In comparing the voltage versus current of a 24" board, it can be seen that the knee of the curve is about 7.4V, so this is where a desired Zener diode would begin conduction to increase the amount of current flowing through Q1, corresponding to a Zener voltage of drop from 7.4V to about 6.6 or about 0.8V. The same principle can be applied to any number of voltage drops needed for a particular LED array configuration. More specifically, in one non-limiting example embodiment employing Nichia 3030 LEDs, the following Zener voltages would be used for 1, 2, 3 or 4 voltage drops:

One LED voltage drop = 2.467 V – 0.6 V = 1.87 V or about 1.9 V;
Two LED voltage drops = 4.933 V – 0.6 V = 4.33 V or about 4.3 V;
Three LED voltage drops = 7.40 V – 0.6 V = 6.80 V or about 6.8 V; and
Four LED voltage drops = 9.87 V – 0.6 V = 9.27 V or about 9.3 V.

These voltages are then rounded to the nearest available Zener diode voltage (shown above) and this process would be applied for LEDs from different manufacturers. The best approach is to characterize the voltage vs current curve to find the appropriate knee voltage. From there, the number of missing parallel diodes can be determined. In a 24 inch LED board, there are three banks of 48 LEDs in parallel. The 21 inch LED board has three banks of 42 LEDs in parallel. Thus the difference in each parallel bank is equal to six LEDs. As a result of this difference, the bleeder circuit would need to consume the same amount of current as the six "missing" diodes in each parallel bank. Referring back to the 24 inch board, one can determine the current consumed by each LED by dividing the total current consumed by the board by 48 (the number of LEDs in each parallel bank). So in this particular example embodiment, when exhibiting an output of about 1400 mA (referred to as a standard output current), the current per LED would be equal to 1400 mA/48 or 29.17 mA, which enables determination of the "missing current" which would then be equivalent (to current on the 21 inch board. bleed) to about 29.17 mA×6 or 175 mA.

This calculation can then be done to determine how much current would need to be consumed for any input current. This can be further simplified by using the ratio of LEDs in each parallel bank by equation as follows:

$$\text{Current bleed} = Iin * (1 - (42/48)) \quad \text{Eq. 3}$$

wherein:
Iin=input current;
42=number of LEDs in each parallel bank of the 21 inch LED board; and
48=number of LEDs in each parallel bank of the 24 inch LED board.

One can then use the same approach to determine the missing current for any board with fewer LEDs in each parallel bank that the LED board must match to achieve a similar luminosity output.

Accordingly, one would then determine the current gain needed to produce the desired current of the bleeder as current increases, and then knowing this value, one can then select the transistors Q1 and Q2. This current gain will be valid only in the linear region of the LEDs voltage vs. current graphs as presented herein. One can see from the equation above that for every 100 mA of increase in current to the LED board that one would need about 12.5 mA of current consumed by the bleeder circuit to stabilize the output illumination.

The first stage of this embodied current amplifier consists of Q1, the biasing resistors R3 and R7 along with the Zener diode and resistor R10. This stage is biased near the cutoff point on the transistor load line. This biasing is set up so the transistor begins to turn on near the same knee voltage of 7.4V. Most of the current gain happens in the second stage that consists of transistor Q3 along with the power dissipation resistors R4 and R11. At 7.4V, the base voltage is given by:

$$Vb = (1k/(13.7k + 1k)) * 7.4 \text{ V} = 0.503 \text{ V} \quad \text{Eq. 4}$$

The addition of the Zener diode and resistor R10 act together to bring this voltage up a bit to 0.527V. This biasing, along with the Zener bias, sharpens the knee of the entire circuit such that it exhibits a very small non-linear portion of the power curve that simulates the sharp knee exhibited by the LEDs themselves. Transistor Q3 is then selected based upon the current gain needed to match the target current consumption.

Actual measured currents in example embodiments are very close to that of the target or theoretical response desired. This keeps the brightness delta between a 24 inch board and, for a non-limiting example, a 21 inch board with the bleeder circuit to less than 10%. 10%. is the upper limit of acceptability based upon observational evaluation. Below 10% cannot be easily detected by the human eye, but can still be improved upon for larger and more extensive luminaire systems, for example ones that employ large surface areas for lighting bigger spaces found in commercial environments employing a multiple number of luminaires, and particularly where the luminaires have different sizes and thus different combinations of LED board lengths and corresponding number of LED elements providing illumination.

FIG. 5 shows an additional and non-limiting example embodiment of a Zener control circuit 500, which consists of an electronic circuit wherein the electronic circuit is electrically coupled to at least one individual LED, an LED subarray, a block of individual LEDS and a block of LED subarrays, and combinations thereof (not shown), to enable the control circuit to turn on, turn off at least one LED and adjust the brightness of that at least one LED; wherein the high potential node (electronic junction) of the control circuit 500 is electrically coupled to the positive side of a direct voltage (DC) power supply source (V1) by means of a positive power tap; wherein the low potential node of the electronic circuit is electrically coupled to a negative side of a direct current (DC) power supply source that is in electrical communication with that DC power supply source via a common ground (indicated in the diagram as a downward triangle, indicating a common connection); wherein the first emitter of a first transistor (Q1) is electronically coupled to the high potential node (being an electronic junction or connection) of resistor R9; wherein the first base of Q1 is simultaneously coupled to the low potential node of R10, coupled to the high potential node of R7 and coupled to the low potential side of R3; wherein the low potential nodes of R6 and R7 are connected to a common ground; wherein the first collector of Q1 is coupled to the high potential node of resistor R6; wherein the low potential node of R6 is connected to a common ground in embodiments in which R7 is absent; wherein the low potential node of R9 is coupled to the second base of a third transistor (Q3); wherein the emitter of transistor Q3 is normally coupled to a common ground, but in this embodiment is shown coupled with an intervening ammeter AM1 which enables the current flow in this leg of the control circuit 500 to be measured with respect to ground; wherein the collector of transistor Q3 is coupled to the low potential side of resistor R4; wherein the high potential side of R4 is coupled to the low potential side of resistor R11; wherein the high potential side of R11 is coupled to the positive side of the DC power supply source (V1); wherein the collector (anode) of a Zener diode Z1 is coupled to the high potential side of resistor R10 and the base (cathode) of the Zener diode Z1 is simultaneously coupled to the high potential side of resistors R3 and R11, and coupled to the positive side of the DC power supply source (V1); wherein C1, C2 and C3 represent the direction of current flow through the sections of the control circuit 500 adjacent; C1 being the current flow and direction of current through resistors R3 and R7 with respect to ground; C2 being the current flow and direction of current through the Zener diode controlled circuit section coupled to resistor R10 which controls the base voltage of the first base of the first transistor Q1; C3 being the current flow and direction of current through the third transistor Q3 which is controlled by the base voltage applied to the base of Q3.

Figure 6:
FIG. 6 shows a trial response plot of particular embodiments resulting from use of a disclosed control circuit.

FIG. 6 shows a trial response plot 600 of particular embodiments resulting from use of a disclosed control circuit. Trace curves show the percent change in overall luminosity for seven embodiments of the disclosure using a control circuit as disclosed driving an LED array, corresponding to Example Embodiment C. Trace curve 620 shows the response at 1400 mA current draw, revealing excellent uniformity and light intensity well below the average human differential in detecting luminosity differences. Trace curve 621 shows the response of the seven embodiments with full dimming at lower applied amperages, which despite showing larger differences in luminosity, still reveal excellent uniformity.

FIG. 7 shows a luminosity plot 700 in units of LUX as determined at the indicated distances 740 from the LED to a white surface of particular embodiments resulting from use of the disclosed control circuit. Here, four embodiments corresponding to Example Embodiment D are compared for their response with respect to measured luminosity at nominal applied current of 1400 mA. Trace 730 shows the response of set 13, for example, in LUX at a distance of 72 inches to 82.5 inches, illustrating excellent uniformity in the light dispersion over a roughly one foot distance variation. Similarly, Traces 732, 734 and 736 show similar and excellent uniformity over the same distance. At zero applied amperages corresponding to full dimming, the four embodiments corresponding to set 10, 11, 12 and 13 show nearly identical response curves, and so appear superimposed with respect to the traces and are not visually distinguishable from one another. The traces reveal that at full dim, no residual leakage occurs from the control circuit so that the LED array controlled therewith are completely deactivated.

The disclosure and Figures disclosed above and herein provide many different embodiments of a Zener diode based control circuit as well as non-limiting example embodiments for implementing different features of the invention as disclosed in this specification and drawings. Specific embodiments of components and processes are described to help clarify the invention. These are, of course, merely embodiments and are not intended to limit the invention from that described in the claims.

The following Figure Key is provided listing cited elements shown in the attached Figures and hereby incorporated into this instant Specification.

| Figure Key APPENDIX | |
|---|---|
| FIG. 1 | |
| 100 | LED circuit control unit |
| 101 | LED array block |
| 102 | Control circuit tap |
| 104 | Control circuit block |
| 105 | Secondary power connector |
| 106 | Power leads |
| 107 | Primary power connector |
| 108 | Positive power tap |
| 109 | Negative power tap |
| 113 | Electrical junction |
| FIG. 2 | |
| 200 | LED circuit diagram |
| 201 | Third LED subarray block |
| 202 | Second LED subarray block |
| 203 | First LED subarray block |
| 204 | Control circuit block |
| 205 | Secondary power connector |
| 206 | Power leads |
| 207 | Primary power connector |
| 208 | Positive power tap |
| 209 | Negative power tap |
| 211 | Control circuit tap |

| Figure Key APPENDIX | |
|---|---|
| 213 | Electrical junction |
| 218 | First inter LED block power tap |
| 228 | Second inter LED block power tap |
| 230 | Power junction |
| 232 | Shunt |
| 234 | DC current source |
| FIG. 3 | |
| 300 | Voltage response plot |
| 301 | Target response curve |
| 302 | Knee inflection point |
| 303 | Onset voltage rise |
| 305 | Simulated current curve |
| 307 | Simulated knee inflection point |
| FIG. 4 | |
| 400 | Voltage response plot |
| 401 | Target response curve |
| 402 | Knee inflection point |
| 403 | Onset voltage rise |
| 405 | Simulated current curve |
| 407 | Simulated knee inflection point |
| 409 | Overdrive inflection point |
| FIG. 5 | |
| 500 | Zener control circuit diagram |
| C1 | Current flow 1 |
| C2 | Current flow 2 |
| C3 | Current flow 3 |
| R3 | Resistor 3 |
| R4 | Resistor 4 |
| R6 | Resistor 6 |
| R7 | Resistor 7 |
| R9 | Resistor 9 |
| R10 | Resistor 10 |
| R11 | Resistor 11 |
| Q1 | Transistor 1 |
| Q2 | Transistor 2 |
| Z1 | Zener diode 1 |
| AM1 | Ammeter 1 |
| FIG. 6 | |
| 600 | Trial response plot |
| 620 | Response at 1400 mA |
| 621 | Response with full dimming |
| FIG. 7 | |
| 700 | Luminosity plot |
| 730 | Response set 13 |
| 732 | Response set 10 (12) |
| 734 | Response set 11 |
| 736 | Response set 12 |
| 738 | Full dim response (set 10, 11, 12) |
| 740 | Measurement distance |

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and, in a manner, consistent with the scope of the invention, as set forth in the following claims.

What is claimed is:

1. An electronically configured control circuit for controlling the dimming and lighting of an associated light emitting diode in a luminaire, comprising:
   (a) a control circuit;
   (b) a direct current (DC) power source providing a high potential positive voltage pole (V+) and a low potential negative ground voltage pole (V−);

(c) a plurality of light emitting diodes (LED);
wherein at least one high potential node of said control circuit is electrically coupled to the positive voltage pole (V+) of said DC power supply;
wherein at least one low potential node of said control circuit is electrically coupled to the negative voltage pole (ground) of said DC power supply;
wherein the high potential node of said control circuit is electrically coupled to V+ and at least one high potential node of at least one LED;
wherein a first emitter of a first transistor (Q1) is electronically coupled to said low potential node of said control circuit and coupled to a second collector of a second transistor (Q2);
wherein a first collector of said Q1 is electronically coupled to a second base of said Q2;
wherein a second emitter of said Q2 is electronically coupled to a low potential node of a first resistor (R1);
wherein a first base of said Q1 is electronically coupled to a high potential node of said R2, a high potential node of a second resistor (R2), a low potential node of a third resistor (R3) and a low potential node of a fifth resistor (R5);
wherein a low potential node of the second resistor (R2) is electronically coupled to said low potential node of said control circuit;
wherein a high potential node of said R5 is electronically coupled to a low potential node of a Zener diode (Z1);
wherein a high potential node of said Z1 is electronically coupled to a high potential node of said R3, a low potential node of a sixth resistor (R6) and a high potential node of a seventh resistor (R7);
wherein a high potential node of said R1 is electronically coupled to a low potential node of said R7;
wherein the high potential node of both said R3 and said R7 are electronically coupled to the low potential node of said R6;
wherein a high potential node of said R6 is electronically coupled to a low potential node of said R4; and
wherein a high potential node of said R4 is electronically coupled to a positive side of the DC power source.

2. The control circuit of claim 1, wherein a second Zener diode is present in the control circuit and electronically coupled to said first Zener diode; and
wherein at least one low potential node, one high potential node, and combinations thereof of said first and said second Zener diodes are electronically coupled.

3. The control circuit of claim 2, wherein said second Zener diode is electrically connected in series, in parallel, stacked with all common nodes electronically coupled, and combinations thereof; and
wherein at least one of the nodes of said second Zener diode is electronically coupled to at least one node of said first Zener diode.

4. The control circuit of claim 1, wherein said control circuit contains one or more additional resistive elements electronically coupled to any one or more of said first, second, third, fourth, fifth, sixth and seventh resistor in an electrically serial, parallel, or mixed serial and parallel configuration, and combinations thereof.

5. An electronically configured control circuit for controlling the dimming and lighting of an associated light emitting diode in a luminaire, comprising:
(a) a control circuit;
(b) a direct current (DC) power source providing a high potential positive voltage pole (V+) and a low potential negative ground voltage pole (V−);
(c) a plurality of light emitting diodes (LED);
wherein at least one high potential node of said control circuit is electrically coupled to the positive voltage pole (V+) of said DC power source;
wherein at least one low potential node of said control circuit is electrically coupled to the negative voltage pole (ground) of said DC power source;
wherein the high potential node of said control circuit is electrically coupled to V+ and at least one high potential node of at least one LED;
wherein a first transistor (Q1) has a first collector that is electronically coupled to a second base of a second transistor (Q2);
wherein a first emitter of Q1 is electronically coupled to ground;
wherein a first base of Q1 is electronically coupled to a high potential node of a first resistor (R1);
wherein a low potential node of R1 is electronically coupled to ground;
wherein the first base of Q1 is electronically coupled to the high potential nodes of a second resistor (R2);
wherein a second collector of Q2 is electronically coupled to ground;
wherein a second emitter of Q2 is electronically coupled to a low potential node of a third resistor (R3);
wherein a high potential node of R3 is connected to a low potential node of a fourth resistor R4;
wherein a low potential node of R4 is electronically coupled to ground;
wherein a high potential node of R4 is connected to V+;
wherein a high potential node of a fifth resistor (R5) is connected to V+;
wherein a low potential node of R5 is connected to the high potential note of R1;
wherein a low potential node of a sixth resistor (R6) is electronically coupled to the high potential node of R2;
wherein a high potential node of R6 is electronically coupled to a first anode of a first Zener diode Z1; and
wherein a first cathode of Z1 is connected to V+.

6. The control circuit of claim 5, wherein a second Zener diode is present in the control circuit and electronically coupled to said first Zener diode; and
wherein at least one low potential node, one high potential node, and combinations thereof of said first and said second Zener diodes are electronically coupled.

7. The control circuit of claim 6, wherein said second Zener diode is electrically connected in series, in parallel, stacked with all common nodes electronically coupled, and combinations thereof; and
wherein at least one of the nodes of said second Zener diode is electronically coupled to at least one node of said first Zener diode.

8. The control circuit of claim 5,
wherein said control circuit contains one or more additional resistive elements electronically coupled to any one or more of said first, second, third, fourth, fifth, sixth and seventh resistor in an electrically serial, parallel, or mixed serial and parallel configuration, and combinations thereof.

9. An electronically configured control circuit for controlling the dimming and lighting of an associated light emitting diode in a luminaire, comprising:
(a) an electronic control circuit;
(b) a high potential positive voltage pole (V+) and a low potential negative voltage pole (V−);

wherein at least one low potential node of said electronic control circuit is electrically coupled to the negative voltage pole (ground);

wherein a highest potential node of said electronic control circuit is electrically coupled to the positive voltage pole V+;

wherein a first transistor (Q1) has a first collector that is electronically coupled to a second base of a second transistor (Q2);

wherein a first emitter of Q1 is electronically coupled to ground;

wherein a first base of Q1 is electronically coupled to a high potential node of a first resistor (R1);

wherein a low potential node of RI is electronically coupled to ground;

wherein the first base of Q1 is electronically coupled to a high potential nodes of a second transistor (R2);

wherein a second collector of Q2 is electronically coupled to ground;

wherein a second emitter of Q2 is electronically coupled to a low potential node of a third resistor (R3);

wherein a high potential node of R3 is connected to a low potential node of a fourth transistor R4;

wherein the low potential node of R4 is electronically coupled to ground;

wherein a high potential node of R4 is connected to V+;

wherein a high potential node of a fifth resistor (R5) is connected to V+;

wherein a low potential node of R5 is connected to the high potential note of R1;

wherein a low potential node of a sixth resistor (R6) is electronically coupled to the high potential node of R2;

wherein a high potential node of R6 is electronically coupled to a first anode of a first Zener diode Z1; and wherein a first cathode of Z1 is connected to V+.

* * * * *